United States Patent
Overton

(10) Patent No.: US 6,975,349 B2
(45) Date of Patent: Dec. 13, 2005

(54) TWO-DIMENSIONAL VIDEO TIMING DISPLAY

(75) Inventor: Michael S. Overton, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 528 days.

(21) Appl. No.: 10/300,059

(22) Filed: Nov. 19, 2002

(65) Prior Publication Data

US 2004/0095468 A1     May 20, 2004

(51) Int. Cl.$^7$ .......................................... H04N 17/00

(52) U.S. Cl. ...................... 348/180; 348/184

(58) Field of Search ....................... 348/180, 194, 348/177, 185, 184, 512, 518, 500, 569, 570; 345/440.1, 660, 665, 208, 23, 24, 25, 94; H04N 17/00, H04N 5/50, 5/04, 9/475

(56) References Cited

U.S. PATENT DOCUMENTS

| | | | |
|---|---|---|---|
| 4,792,845 A | 12/1988 | Judge | |
| 4,816,897 A | 3/1989 | Konishi | |
| 4,875,089 A | 10/1989 | Judge | |
| 5,530,483 A | 6/1996 | Cooper et al. | |
| 6,069,607 A | 5/2000 | Everett et al. | |
| 6,275,257 B1 * | 8/2001 | Tallman et al. | 348/184 |

FOREIGN PATENT DOCUMENTS

| | | |
|---|---|---|
| DE | 37 22 460 | 1/1989 |
| EP | 0 336 594 | 10/1989 |
| GB | 2 282 929 | 4/1995 |

* cited by examiner

*Primary Examiner*—Sherrie Hsia
(74) *Attorney, Agent, or Firm*—Francis I. Gray; Matthew D. Rabdau

(57) ABSTRACT

A two-dimensional video timing display with numeric readouts allows a user to quickly, easily and precisely measure the timing difference between video signals. A graphic display area within a raster display region provides a two-dimensional display of vertical timing offset and horizontal timing offset of an input video signal with respect to a reference video signal, the graphic display area including a reference indicator centered in the graphic area indicating the timing of the reference video signal and a timing indicator in the graphic area indicating the timing of the input video signal with respect to the reference video signal. A numeric display area is adjacent the graphic display area to display the actual vertical and horizontal timing offsets in appropriate units according to the format of the input video signal with a precision to one video clock cycle. Also the source of the reference video signal and optionally an alarm when the timing between the two video signals is outside predetermined limits may be shown in the numeric display area. For an instrument having a tiled raster display a vector display may be shown in conjunction with the timing display to provide fine subcarrier phase discrimination between analog composite video signals for hue matching.

24 Claims, 3 Drawing Sheets

TWO-DIMENSIONAL VIDEO TIMING DISPLAY

BACKGROUND OF THE INVENTION

The present invention relates to video timing, and more particularly to a two-dimensional video timing display with numeric readouts to allow a user to quickly, easily and precisely measure the timing difference between video signals.

The traditional method for checking timing between video signals is to use a waveform display and a vectorscope. The signal of interest is used as the input and a reference signal is applied to an "external" reference port. First one uses a field rate sweep to check vertical timing. Next one uses a line rate sweep to check horizontal timing. Finally in a composite system one uses an SCH (subcarrier-to-horizontal) mode to insure color frames are aligned and to see the timing with enough precision to match the subcarrier phases.

This traditional method is time consuming, difficult and fraught with possibilities for error. To see the horizontal and vertical timing one must shift the waveform and zoom in on features. As the system is adjusted to the desired timing, the display must be manually positioned to follow. Checking the horizontal timing may be imprecise because of the slow rise times of the video sync pulses. Also not all monitors display SCH correctly when in external reference mode so alignment of color frames is problematic. Finally one may have to switch between internal and external reference mode, or switch between the inputs, to compare the timing of the signals.

An alternative method of timing offset determination is to look at a picture relative to the external reference. This has the advantage of showing both the horizontal and vertical offset at the same time. Unfortunately it is difficult to be precise with this method and it is not well suited for checking color frame alignment.

What is desired is the convenience of the picture method while improving accuracy and the ability to show color frame timing when appropriate to minimize operator errors.

BRIEF SUMMARY OF THE INVENTION

Accordingly the present invention provides a two-dimensional video timing display with numeric readouts to allow a user to quickly, easily and precisely measure the timing difference between video signals. A graphic display area within a raster display region provides a two-dimensional display of vertical timing offset and horizontal timing offset of an input video signal with respect to a reference video signal, the graphic display area including a reference indicator centered in the graphic display area indicating timing for the reference video signal and a timing indicator in the graphic area indicating the timing of the input video signal with respect to the reference video signal. A numeric display area is adjacent the graphic display area to display the actual vertical and horizontal timing differences in appropriate units according to the format of the input video signal with a precision to one video clock cycle. Also the source of the reference video signal and optionally an alarm when the timing between the two video signals is outside predetermined limits may be shown in the numeric display area. For an instrument having a tiled raster display a vector display may be shown in conjunction with the timing display to provide fine subcarrier phase discrimination between analog composite video signals for hue matching.

The objects, advantages and other novel features of the present invention are apparent from the following detailed description when read in conjunction with the appended claims and attached drawing.

DETAILED DESCRIPTION OF THE INVENTION

Figure 1:
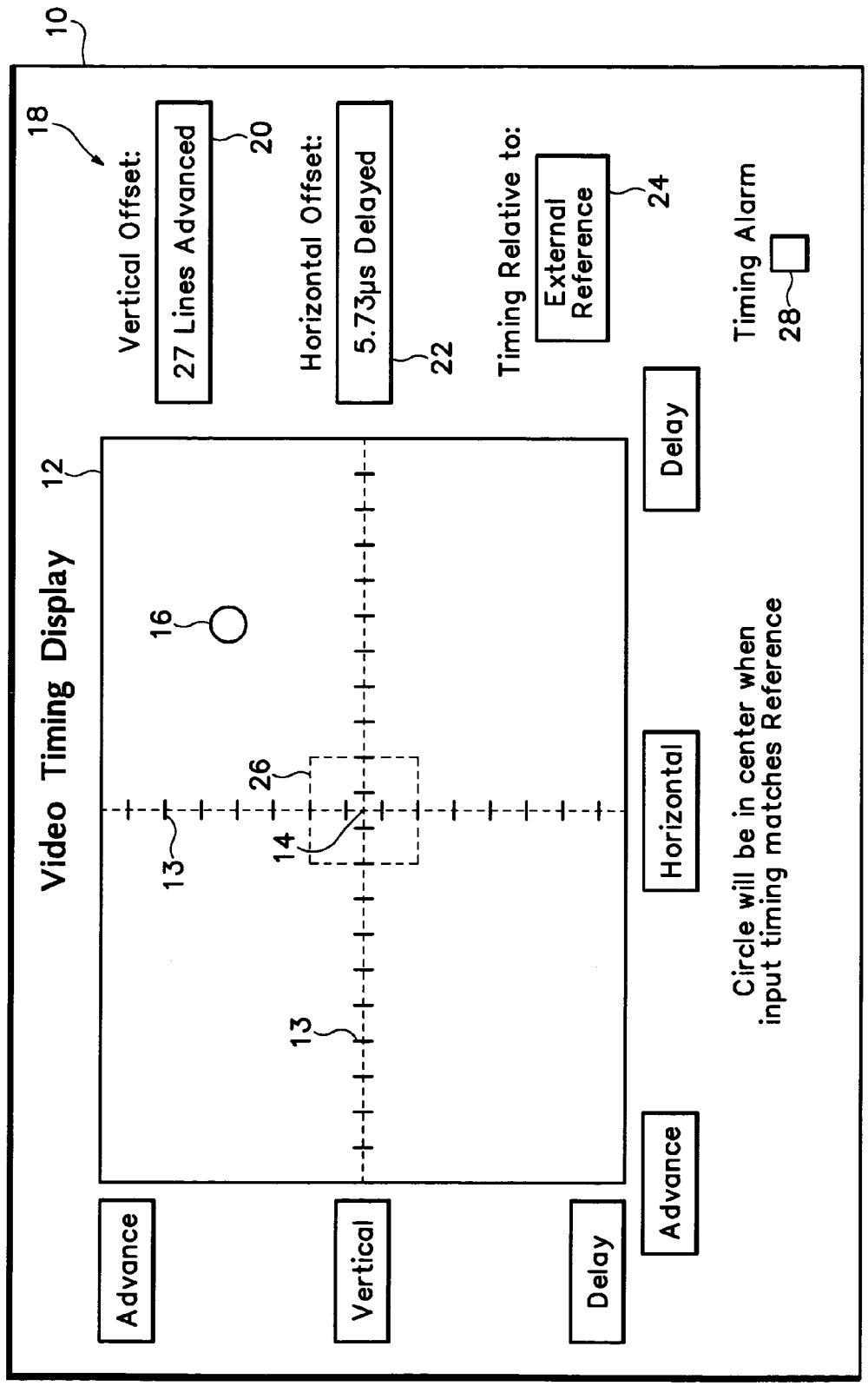
FIG. 1 is a plan view of a two-dimensional video timing display according to the present invention.

Referring now to FIG. 1 a video timing display according to the present invention is shown. A graphic display area 12 within a raster display region 10 has vertical timing along one axis and horizontal timing along the other. In the center of the graphic display area 12 is a reference indicator 14 representing a reference timing position for a reference video signal. A timing indicator 16 also is shown to visually depict the timing of an input video signal with respect to the reference video signal. A numeric readout area 18 adjacent the graphic display area 12 provides numeric values for vertical offset 20 and horizontal offset 22. Also provided is a reference source indicator 24 of the reference video source. The horizontal axis of the graphic display area 12 is line timing advance or delay, and the vertical axis timing is the timing within the frame. When the timing indicator 16 is aligned with the reference indicator 14, then the input video signal is correctly timed to the reference video signal. To uniquely determine the timing between the video signals the line and frame rate of the input video signal must be an integer multiple of the reference video signal rates.

The reference indicator 14 may be, for example, in the form of a cross in the center of the graphic display area 12, as shown in solid, or may be extended to the full width of the graphic display area, as shown in dotted, with tic marks 13 representing rough offset divisions—Y lines per division or X microseconds per division according to the video standard of the input video signal. The timing indicator 16 may be of any suitable form, such as the circle shown by way of illustration.

The width of the horizontal axis as shown in this embodiment is one video line, so the scale is +/−½ line. The vertical dimension changes depending upon the format of the input video signal. For interlaced digital signals the vertical dimension is one frame (two fields), for composite signals such as NTSC and PAL it is one color frame (four or eight fields), and for progressive signals it is one field.

The numeric information provides a more precise result than the graphical method alone without having to expand the display. Both the graphical display and the numeric readout are shown in terms of the horizontal and vertical dimensions. This is convenient to a user since that is how the adjustment to correct timing is presented.

As shown by the reference source indicator 24 the timing of the input video signal is relative to an external reference video signal. This is effectively an absolute mode in that the external reference video signal represents a timing standard for a video facility. The user may also choose another video input as the basis for the display. In that case the first input video signal is compared to the external reference video signal, and the offset is stored as a "baseline". Subsequent input video signals may then be compared to the baseline. In this mode the baseline timing is represented by the reference indicator 14, and the reference source indicator 24 shows "Stored Baseline". This latter mode is useful in timing the inputs to a switcher, since in this case the absolute timing is not important. What is important is that all the input signals arrive at the same time. By using one of the input video signals to generate the stored baseline, then timing the rest of the input video signals to match, the display affords an easy way to time down a switcher.

Figure 3:
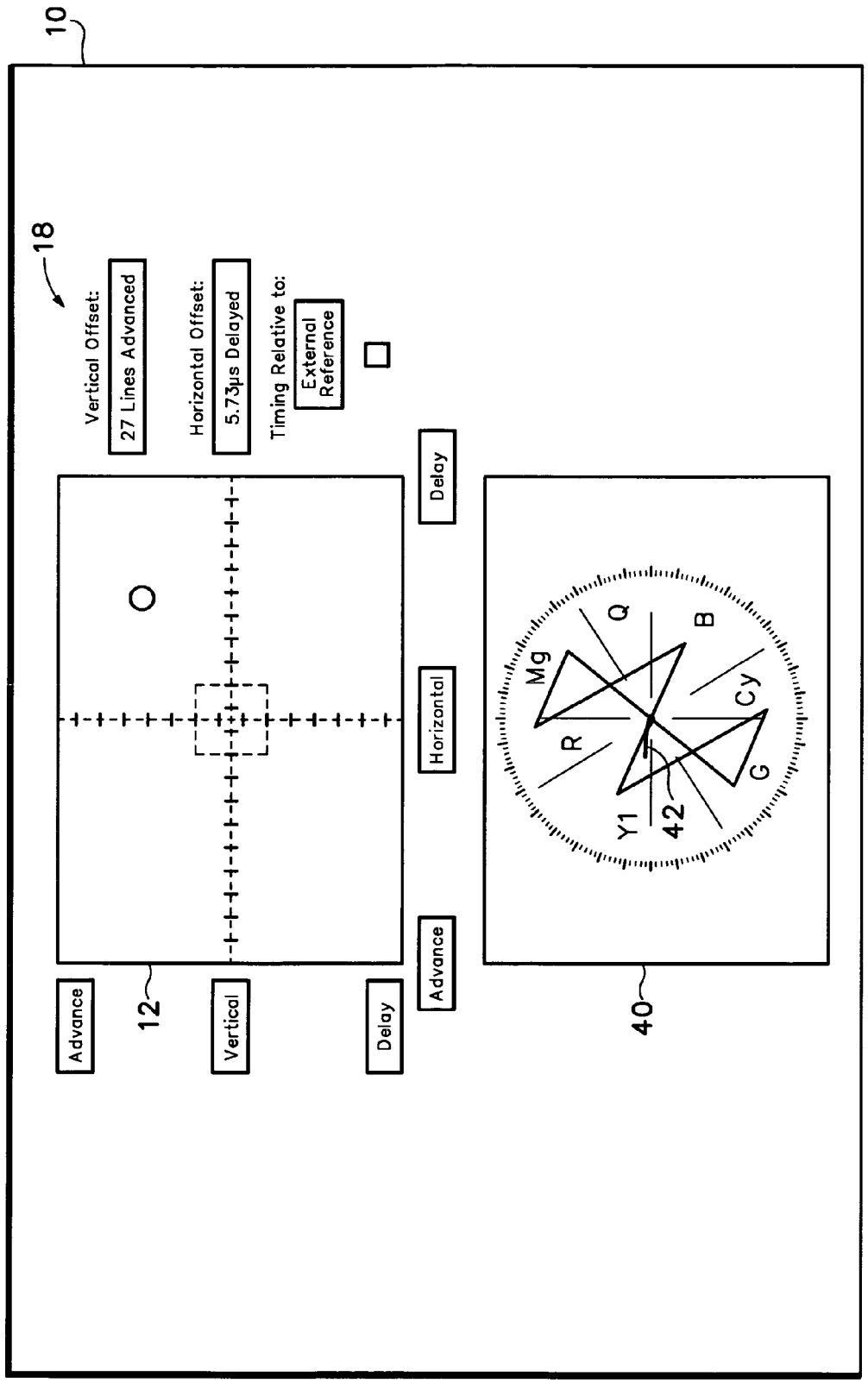
FIG. 3 is a plan view of the two-dimensional video timing display as shown in FIG. 1, with an adjacent vectorscope display.

For a digital switcher the display has more precision than is needed since most switchers have some allowance for timing errors on their inputs. Analog composite switchers are not so forgiving. For the analog applications the present display may be used to get within a video clock cycle, and then a vectorscope display 40 or other method may be used to get the very fine discrimination of a subcarrier phase 42. This is very convenient for an instrument having a "tiled" display, since the vector display 40 may be displayed simultaneously with the timing display 12, as shown in FIG. 3.

Other uses for the timing display include automation. Since the timing display gives numeric results, it is possible to read the timing error and apply the necessary timing correction via an automation system to the input video signal without user intervention. This allows significant time savings in setting up for a video production.

Graticules may be added to show an allowable range for timing on less critical situations. These may be horizontal and vertical bars that define a smaller window 26 within the graphic display area 12 around the reference indicator 14. If the timing indicator 16 is within the box, then the timing is OK. Once a region of acceptable timing is defined, it is possible to generate an alarm if the timing is outside the region. This alarm may use instrument reporting methods, such as SNMP (System Network Management Protocol—Internet Engineering Task Force (IETF) Request for Comment (RFC) 1157) traps, on-screen icons 28 and ground closures to inform the user or automation system of the situation.

Figure 2:
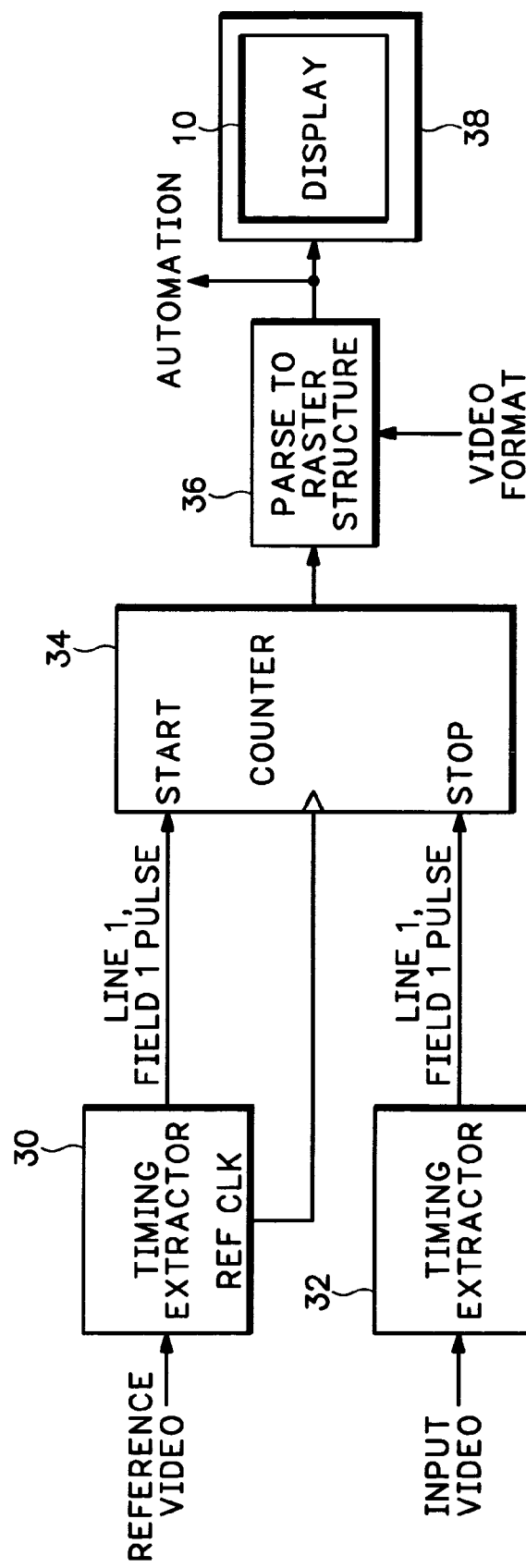
FIG. 2 is a simple block diagram view of an apparatus for generating a two-dimensional video timing display according to the present invention.

As shown in FIG. 2 a particular implementation has four parts. The reference and input video signals are input to respective timing extractors 30, 32 which detect line one of field one for both input video signals, at which time a pulse is generated. A counter 34 is used to measure the time difference between the pulses extracted from the two input video signals. One of the pulses starts the counter 34, which counts video clock cycles derived generally from the reference video signal extractor 30, and the other one of the pulses stops the counter. The value from the counter 34 is input to a parser 36 which parses the counter value into horizontal and vertical advance or delay according to the raster structure of the input video signal. The parser 34 receives information about the particular video standard of the input video signal, which may be preloaded or loaded "on-the-fly" from a processor that may either detect the standard from the input video signal or may have the standard input via a user interface. For example if a particular video standard has M video clock cycles per line and N lines per field/frame, then the vertical offset is Int(C/M) and the horizontal offset is Rem(C/M) where C is the count value from the counter 34 between start and stop. Rem(C/M) may be converted to time by multiplying by the period of the video clock cycle. Advance or delay may be determined from the count by subtracting one-half the vertical/horizontal range from the respective determined offsets and checking the sign—negative is delay and positive is advance. The results from the parser 36 are then provided to an instrument display 38 in the raster display region 10 as the timing display shown in FIG. 1. The results also may be output to an automation system to provide automatic timing adjustment for the input video signal.

Thus the present invention provides a two-dimensional timing display with numeric readouts that provides a measurement within a cycle of a video clock rate, which is more than adequate for the needs of modern digital studios. More precision for matching hue of analog composite sources is provided by using a conventional vectorscope in conjunction with the timing display to provide the final fine subcarrier phase discrimination.

What is claimed is:

1. A two-dimensional video timing display for measuring a timing difference between video signals comprising:
   a graphic display area on a display screen having a horizontal axis for displaying horizontal timing offset and a vertical axis for displaying vertical timing offset, the graphic display area including a reference indicator for a reference video signal and a timing indicator for an input video signal; and
   a numeric display area on the display screen adjacent the graphic display area for displaying absolute timing offsets between the video signals.

2. The display as recited in claim 1 further comprising a reference source indicator in the numeric display area.

3. The display as recited in claim 2 wherein the reference source indicator comprises an alphanumeric indicator representing the reference video signal being selected from the group consisting of an external reference video signal and a baseline input video signal.

4. The display as recited in claim 1, 2 or 3 further comprising a graticule in the graphics display area enclosing the reference indicator to define an allowable timing range.

5. The display as recited in claim 4 further comprising a vectorscope display area on the display screen adjacent the graphic and numeric display areas for providing fine subcarrier phase discrimination for matching hue between analog composite video signals as the video signals.

6. The display as recited in claim 4 further comprising an alarm in the numeric display area for indicating when the timing indicator is outside the allowable timing range.

7. The display as recited in claim 1 wherein the reference indicator comprises a cross centered in the graphic display area.

8. The display as recited in claim 7 wherein the cross comprises a pair of orthogonal lines extending across the graphic display area.

9. The display as recited in claim 8 wherein the reference indicator further comprises tic marks along each orthogonal line.

10. The display as recited in claim 1 wherein the timing indicator comprises a circle.

11. An apparatus for measuring timing between video signals comprising:
   means for extracting a pulse from each video signal corresponding to line one, field one;
   means for determining an interval between the two pulses;
   means for parsing the interval as a function of a video standard for the video signals to generate a horizontal timing offset and a vertical timing offset; and means for displaying the horizontal and vertical timing offsets as a timing display including graphic and numeric display areas on a display screen.

12. The apparatus as recited in claim 11 wherein the displaying means comprises a tiled raster display including the timing display as one of a plurality of tiles for the tiled raster display.

13. The apparatus as recited in claim 12 wherein the tiled raster display includes a vectorscope display as another one of the plurality of tiles for use in conjunction with the timing display to provide fine discrimination of subcarrier phase for hue matching between analog composite signals as the video signals.

14. The apparatus as recited in claim 11 wherein the horizontal and vertical timing offsets are made available for use by an automation system to automatically align the video signals in time.

15. The apparatus as recited in claim 11 wherein the timing display comprises:
the graphic display area having a horizontal axis for displaying horizontal timing offset and a vertical axis for displaying vertical timing offset, the graphic display area including a reference indicator for a reference video signal and a timing indicator for an input video signal; and
the numeric display area being adjacent the graphic display area for displaying absolute timing offsets between the video signals.

16. The apparatus as recited in claim 15 wherein the timing display further comprises a reference source indicator in the numeric display area.

17. The apparatus as recited in claim 16 wherein the reference source indicator comprises an alphanumeric indicator representing the reference video signal being selected from the group consisting of an external reference video signal and a baseline input video signal.

18. The apparatus as recited in claim 15, 16 or 17 wherein the timing display further comprises a graticule in the graphics display area enclosing the reference indicator to define an allowable timing range.

19. The apparatus as recited in claim 18 wherein the timing display further comprises a vectorscope display area on the display screen adjacent the graphic and numeric display areas for providing fine subcarrier phase discrimination for matching hue between analog composite video signals as the video signals.

20. The apparatus as recited in claim 18 wherein the timing display further comprises an alarm in the numeric display area for indicating when the timing indicator is outside the allowable timing range.

21. The apparatus as recited in claim 15 wherein the reference indicator comprises a cross centered in the graphic display area.

22. The apparatus as recited in claim 21 wherein the cross comprises a pair of orthogonal lines extending across the graphic display area.

23. The apparatus as recited in claim 22 wherein the reference indicator further comprises tic marks along each orthogonal line.

24. The apparatus as recited in claim 15 wherein the timing indicator comprises a circle.

* * * * *